S. T. FREAS.
INSERTIBLE TOOTH SAW.
APPLICATION FILED NOV. 1, 1917.
1,281,935.
Patented Oct. 15, 1918.
2 SHEETS—SHEET 1.
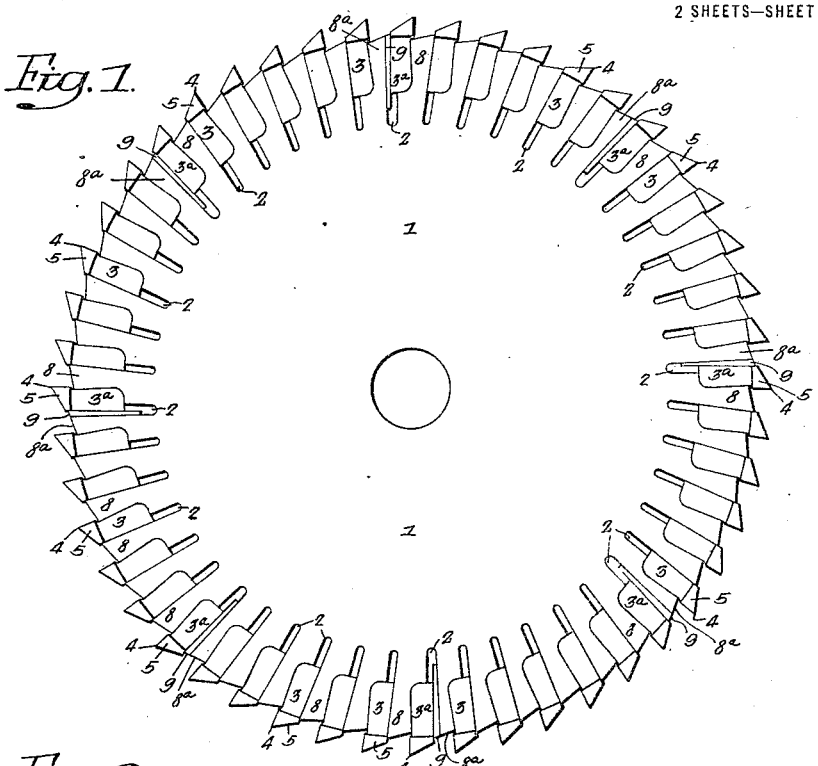
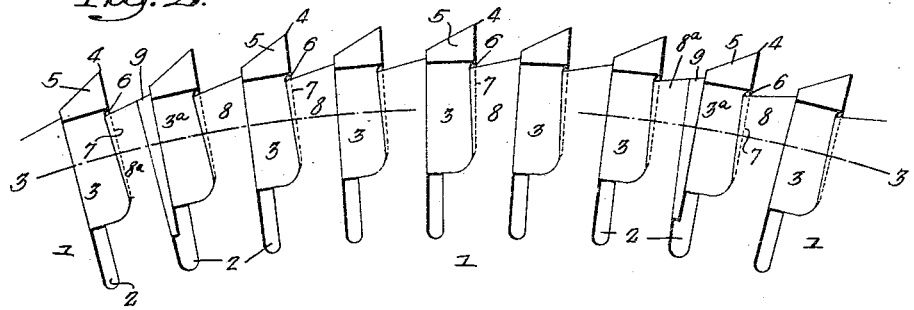
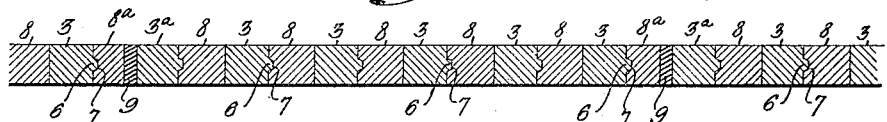
Inventor—
Samuel T. Freas.
by his Attorneys.—
Howson & Howson

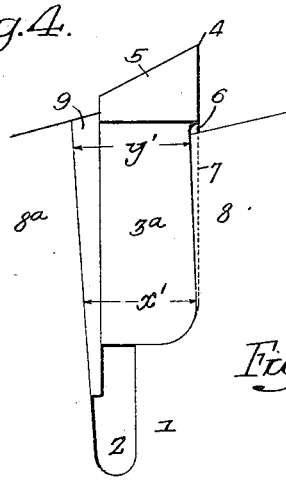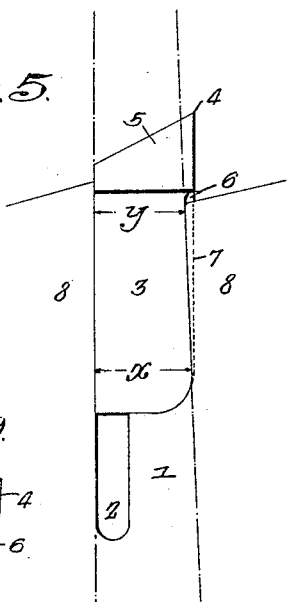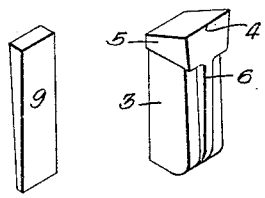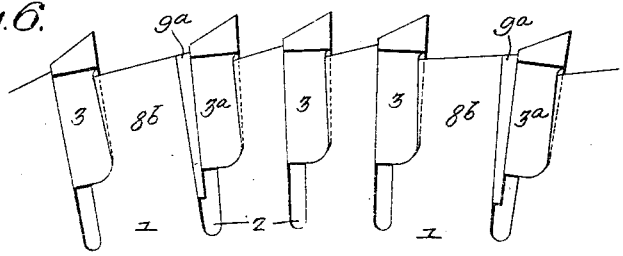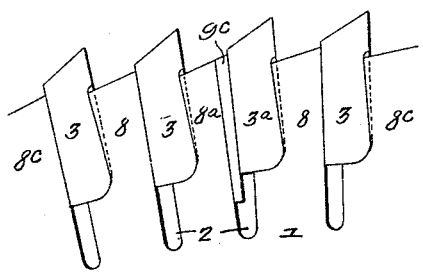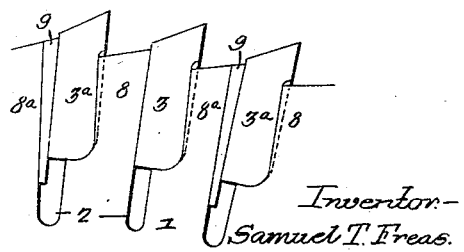

UNITED STATES PATENT OFFICE.

SAMUEL T. FREAS, OF TRENTON, NEW JERSEY, ASSIGNOR TO HENRY DISSTON & SONS, INCORPORATED, OF PHILADELPHIA, PENNSYLVANIA, A CORPORATION OF PENNSYLVANIA.

INSERTIBLE-TOOTH SAW.

1,281,935.

Specification of Letters Patent.

Patented Oct. 15, 1918.

Application filed November 1, 1917. Serial No. 199,701.

*To all whom it may concern:*

Be it known that I, SAMUEL T. FREAS, a citizen of the United States, and a resident of Trenton, county of Mercer, State of New Jersey, have invented certain Improvements in Insertible-Tooth Saws, of which the following is a specification.

One object of my invention is to provide a circular saw with insertible teeth, which are arranged close together.

Another object of the invention is to retain a series of teeth by a single fastening device and a circular saws to retain a number of teeth in place by a less number of wedges or other fastenings.

In the accompanying drawings:

Figure 1 is a side view of a circular saw illustrating my invention;

Fig. 2 is an enlarged side view of a portion of the saw illustrated in Fig. 1;

Fig. 3 is a sectional plan view on the line 3—3, Fig. 2;

Fig. 4 is an enlarged view of one of the teeth at the wedge;

Fig. 5 is a view of one of the intermediate teeth;

Figs. 6, 7 and 8 are views illustrating a modification of the invention;

Fig. 9 is a perspective view of one of the teeth; and

Fig. 10 is a perspective view of one of the wedges located back of one of the teeth.

1 is the saw blade having a series of recesses 2 for the reception of the teeth 3. Each tooth has a beveled cutting edge 4 formed on a head 5, which is slightly larger than the body portion of the tooth. At the front of each tooth is a rib 6 adapted to a groove 7 in one face of the projection 8 of the body portion which separates the several recesses 2. These projections are comparatively narrow and have a certain amount of spring due to the depth of the recesses 2. At the back of one of the teeth $3^a$ is a wedge 9, which may be flat at the back, as shown, or may have a tongue and groove connection with the blade, if desired. The teeth are placed in the recesses and the wedges 9 are driven up, causing all of the teeth of the series 3 to be clamped between the projections 8, due to their elasticity, so that one wedge retains a number of teeth in the blade.

The recesses for the teeth 3 are wider at the base $x$ than at $y$, Fig. 5, so as to form an undercut groove for each tooth, which is shaped as shown, but the recesses for the teeth $3^a$, and their wedges 9, are wider at $y'$ than at the base $x'$. The front face of each recess is of the same bevel as the recesses for the teeth 3, as all the teeth 3 and $3^a$ are of the same contour. This enlargement of the recess is due to the fact that the wedge, or key, is beveled in the reverse direction.

In Fig. 2, I have shown six teeth in a set and the two wedges 9 tend to clamp the teeth firmly in position so that when the entire circle is completed the wedges retain all of the teeth in position, and, consequently, there are a fewer number of fastening devices than there are teeth.

In Fig. 6, I have shown a modification in which there are sets of three teeth and a wide abutment $8^b$ so that one wedge $9^a$ forces the teeth and the intervening projections against the opposite abutment $8^b$. In Fig. 7, I have shown two abutments $8^c$ and four teeth, and a wedge $9^c$ centrally located between the abutments so that the teeth are divided and one set forced against one abutment and the other set against the other abutment.

In Fig. 8, I have shown a series of teeth in which there is a wedge at every other tooth.

As illustrated in the drawings, the teeth are located in the main recesses 2. The recesses are extended beyond the base of the teeth and are comparatively narrow so as to allow the projections between the teeth to yield readily when the wedge is driven.

Thus it will be seen by the above construction that instead of having a wedge to lock each tooth in position, a fewer number of wedges is used and the pressure of a single wedge is transmitted through a series of teeth and a series of projections, making a very substantial saw for metal, and one in which the teeth can be readily replaced.

It will be understood that while I have shown a particular form of tooth, the character of the tooth may be varied as desired, and while I prefer to have the teeth spaced an equal distance throughout the entire circumference of the saw, they may be spaced in sets, if desired.

I claim:

1. The combination in a saw, of a blade having a series of recesses forming projections; teeth mounted in the recesses; and a single wedge driven between the blade and a tooth, holding a series of teeth to the blade.

2. The combination in a circular saw, of a blade having a series of recesses in its periphery arranged comparatively close together and forming projections, the recesses being wider at the base than at the outer end and a series of tapered teeth, the majority of the teeth being of a size to fit the recesses while the remainder of the teeth are less in width than the recesses; and wedges adapted to be driven between the last mentioned teeth and the walls of the recesses.

3. The combination in a circular saw, of a blade having a series of recesses spaced apart throughout its periphery forming peripheral projections; a tooth mounted in each recess; and a series of flat wedges less in number than the teeth and driven back of some of the teeth to hold the series of teeth to the blade, each tooth having a rib-and-groove connection with the blade at its front edge.

4. The combination in a saw, of a blade having a series of recesses spaced apart, each recess being reduced in width so as to form a shoulder; teeth mounted in the recesses and resting on the shoulders; and a single wedge arranged to be driven so as to distort the projections formed by the recesses and to clamp the series of teeth to the blade.

In witness whereof I affix my signature.

SAMUEL T. FREAS.

Copies of this patent may be obtained for five cents each, by addressing the "Commissioner of Patents, Washington, D. C."